United States Patent

[11] 3,532,141

| | | |
|---|---|---|
| [72] | Inventors | Haim J. Kamner<br>Chicago;<br>Richard E. Rogers, Oswego, Illinois |
| [21] | Appl. No. | 750,700 |
| [22] | Filed | Aug. 6, 1968 |
| [45] | Patented | Oct. 6, 1970 |
| [73] | Assignee | Baldwin-Lima-Hamilton corporation<br>Chicago, Illinois<br>a corporation of Delaware |

[54] TREE HARVESTING AND PROCESSING DEVICES
10 Claims, 7 Drawing Figs.

[52] U.S. Cl. .................................................. 144/309,
144/2, 144/3, 144/34
[51] Int. Cl. ..................................................... A01g 23/02
[50] Field of Search .......................................... 144/2—21,
3—4, 34, 34—5, 309—34, 208—3.5

[56] References Cited
UNITED STATES PATENTS
2,707,007  4/1955  Shuff ...................... 144/2X Primary Examiner—Gerald A. Dost
Attorneys—Carl C. Batz and Andrew J. Beck ABSTRACT: A tree harvesting and processing device for harvesting standing trees, the device including upper and lower sections moveable toward and away from each other. Each section includes a tree shear and clamp to top, delimb, score and buck a standing tree into pulpwood lengths. To aid in fixing the upper section to the tree during delimbing and scoring movement of the lower section, control means operatively connected between the upper shear and the upper clamp are provided to partially embed the upper shear in the tree during delimbing movement of the lower section.

Patented Oct. 6, 1970

3,532,141

INVENTORS
HAIM J. KAMNER
RICHARD E. ROGERS
Carl C. Batz
ATTY.

Patented Oct. 6, 1970

INVENTORS
HAIM J. KAMNER
RICHARD E. ROGERS

Carl C. Batz
ATTY.

Patented Oct. 6, 1970

INVENTORS
HAIM J. KAMNER
RICHARD E. ROGERS

Carl C. Batz
ATTY.

TREE HARVESTING AND PROCESSING DEVICES

BACKGROUND OF THE INVENTION

This invention relates generally to tree harvesting and processing devices and, more specifically, to tree harvesting shear and clamp assemblies.

In Applicant's assignees copending application by Sutherland, Ser. No. 692,749, filed Dec. 22, 1967, entitled "Tree Harvester", a novel apparatus is disclosed which includes a harvesting and processing device supported on a telescopic boom. The device comprises upper and lower sections, each including a hydraulically actuated tree shear and clamp for clamping the device to a standing tree and subsequently topping, delimbing, scoring and bucking a tree into pulpwood lengths or bolts. The upper and lower sections are relatively vertically moveable by vertical hydraulic cylinders to facilitate a step-by-step harvesting action as the device is moved down a standing tree.

Operation of the device, which may be automatically performed in proper sequence, may be generally summarized as follows. After initial positioning of the device to embrace the top of a tree to be harvested, the top clamp is actuated to grasp the tree and support the entire device thereon. The telescopic boom is placed in a float condition. Subsequently, the vertical cylinders may be extended whereby the lower section is forcefully lowered to an extent limited by maximum extension of these cylinders. In this manner, a portion of the tree embraced by the lower section during such movement is delimbed and scored. The lower clamp is then set, the upper shear actuated to completely sever the top of the tree, which is discarded, the upper clamp and shear opened, and the vertical cylinders retracted to move the upper section to a lower portion of the tree adjacent the lower section. This sequence of operation may be automatically repeated to move the device down the tree in a step-by-step manner and a kicker means may be provided to direct the fall of a series of bolts into a chute mounted on the telescopic boom which conveys the bolts to a collection area or means. Such compact tree harvesting and processing devices are particularly advantageous over the prior art devices which generally have been large, complex, expensive and so cumbersome that, as a practical matter, they could not be conveniently maneuvered in a forest to be harvested.

In operating a device of the type disclosed in the heretofore identified Sutherland application, it is important that the upper section be rigidly fixed to the tree during downward movement of the lower section if proper bolt length, delimbing and scoring is to be achieved. Although the upper section includes a tree clamp for this function, it sometimes occurs that, due to the substantial axial forces generated during downward movement of the lower section, the gripping force generated by the upper clamp is insufficient and the upper section is inadvertently forced upwardly thereby hampering smooth operation of the overall device. This problem is particularly emphasized because the telescopic boom is normally placed in a float condition and the device is entirely supported on the tree by virtue of the action of the clamps.

SUMMARY OF THE INVENTION

It is a general object of the present invention to provide a tree harvesting method and apparatus of the type heretofore described which circumvents and minimizes the problems noted above.

In achieving this general object, the present invention provides a tree harvesting method and apparatus, the apparatus including first and second sections movable toward and away from each other. The first section includes a severing means and the second section includes a delimbing means. To facilitate fixing the upper section to a tree during delimbing movement of the second section, means are provided to partially embed said severing means in the tree during said movement.

BRIEF DESCRIPTION OF THE DRAWINGS

A more thorough understanding of one embodiment of the present invention may be gained by reference to the accompanying drawings, in which.

DETAILED DESCRIPTION OF THE INVENTION

Figure 1:
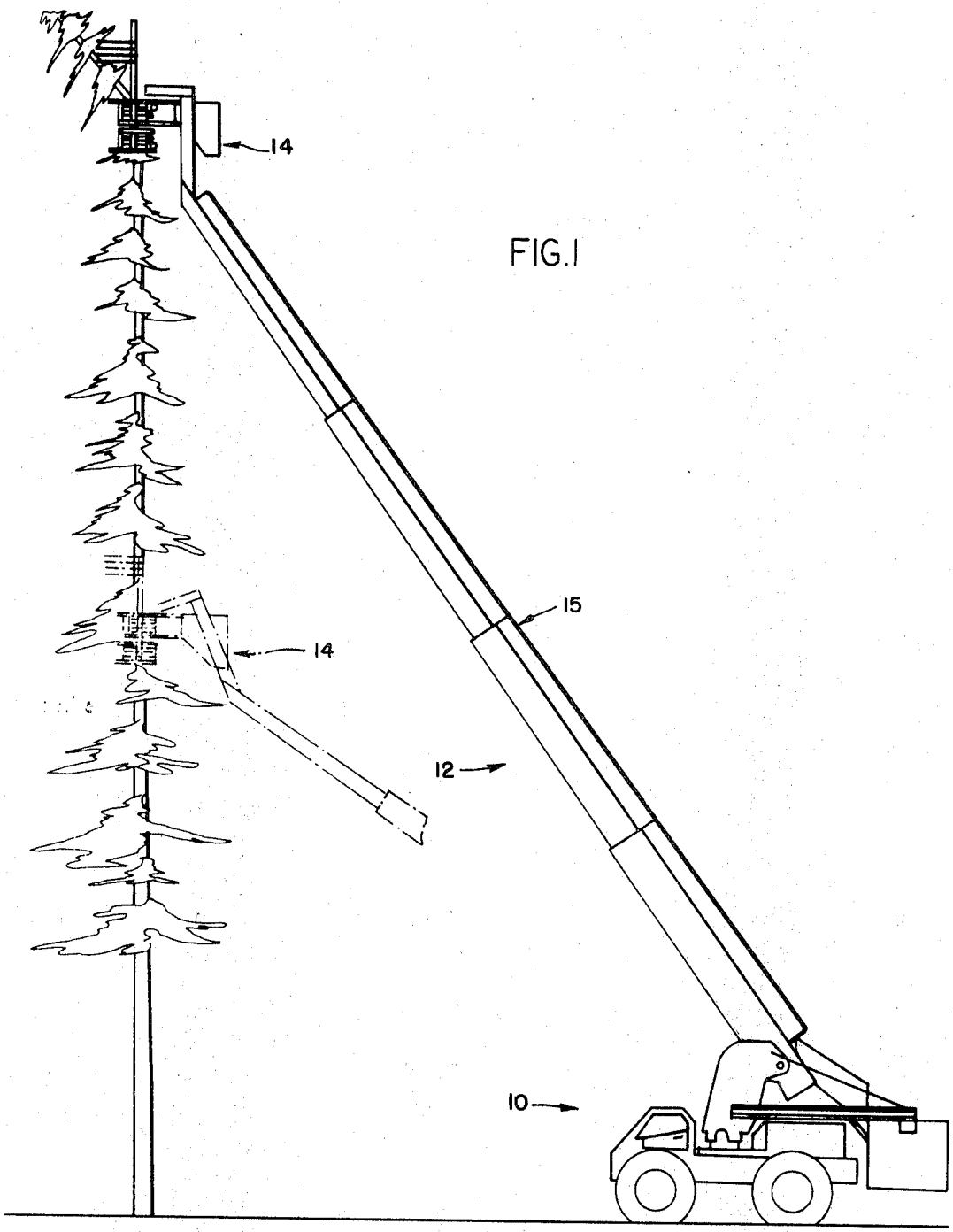
FIG. 1 is an elevational view showing in full line a tree harvesting and processing device according to the present invention positioned adjacent the top of the tree and a fragmentary showing in phantom line of the device after a few bolts have been harvested from the tree.

Referring in more detail to FIG. 1 of the drawings, the tree harvesting and processing device forming the basis of the present invention, as generally disclosed in the previous identified Sutherland application, comprises a self-propelled, crane-type vehicle 10, on which an extensible boom 12 is mounted. The boom 12 may be of the hydraulically actuated, telescopic type and is pivotally supported on the vehicle 10 for sweeping movement in vertical and horizontal directions for harvesting standing trees in a generally semicircular area about the front of the vehicle. On the upper or free end of the boom 12, a tree shear and clamp assembly 14 is provided for topping, delimbing, scoring and severing or bucking a standing tree into pulpwood lengths or bolts. A telescopic conveyor 15 is provided to direct severed or sheared bolts to a collection area or means.

Figure 2:
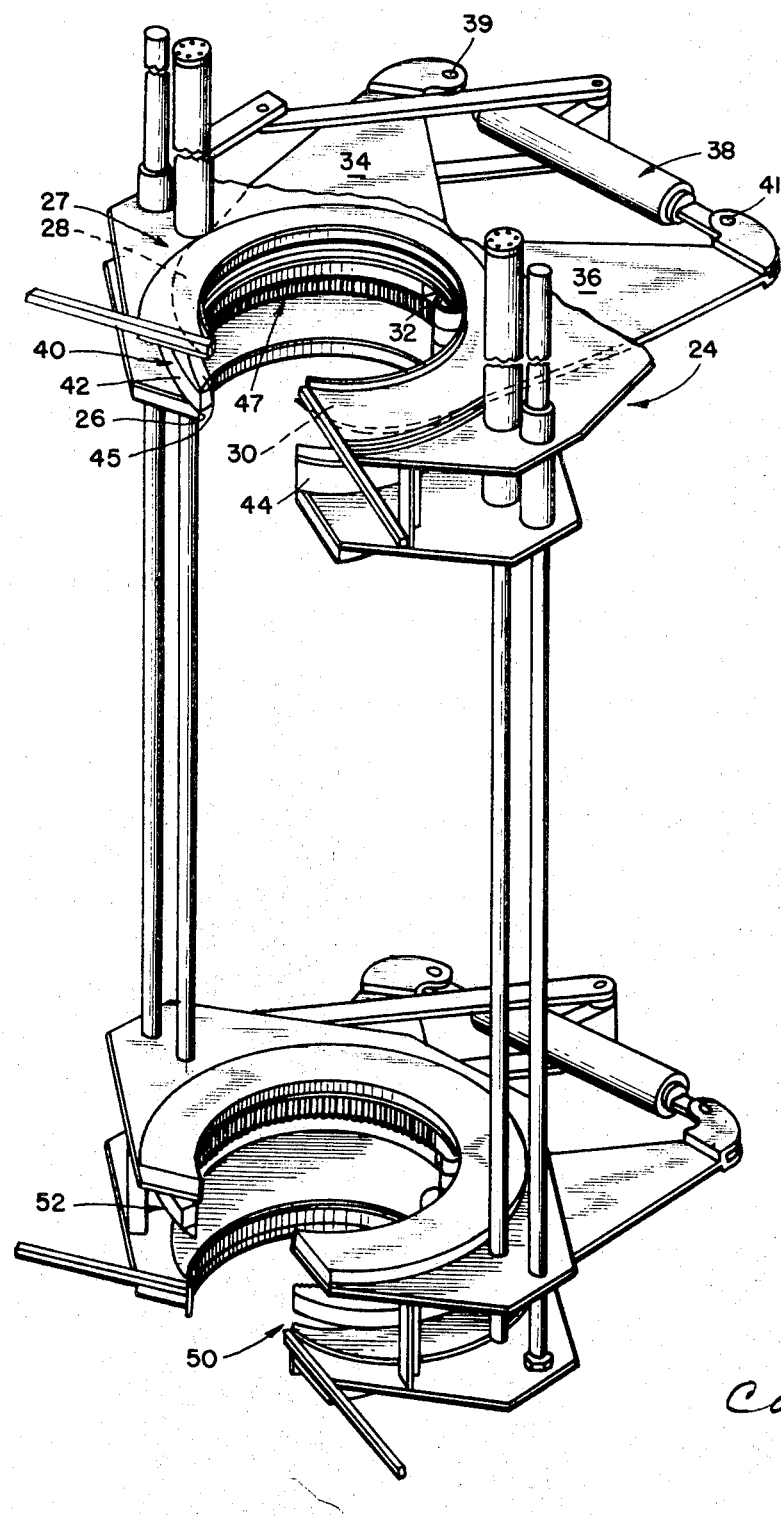
FIG. 2 is a fragmentary, perspective view from the front of a tree shear and clamp assembly shown in its extended condition of the device shown in FIG. 1.

With reference to FIG. 2 of the drawings, the tree shear and clamp assembly 14 comprises upper and lower sections 16 and 18 connected together for relative vertical movement by a pair of vertically extending double-acting hydraulic cylinders 20 and guide rods 22, the lower ends of which are fixed to the lower section 18.

The upper section comprises a frame 24 having an arcuate recess 26 therein which is adapted to embrace a standing tree. An upper shear 27 is provided, this shear including a pair of shear blades 28 and 30 having arcuate shearing surfaces on their forward ends adjacent the recess 26. The blades 28 and 30 are pivotally mounted intermediate their length on the frame 24 by a common vertical pivot pin 32. The inner or rear ends 34 and 36 of the blades 28 and 30 extend rearwardly beyond the pin 32 and a double-acting, upper shear hydraulic cylinder assembly 38 is positioned therebetween. The cylinder and rod ends of the cylinder assembly 38 are pivotally connected by cylinder pins 39 and 41 to the rear ends 34 and 36 of the blades 28 and 30 respectively, whereby extension or retraction of the cylinder assembly 38 pivots the blades 28 and 30 about the pivot pin 32 to close and open the shear assembly in a scissor-like manner.

Positioned on the frame 24 immediately below the shear 27 is an upper tree clamp 40. The upper clamp 40 comprises a pair of arcuate jaws 42 and 44 pivotally mounted on a lower portion of the pivot pin 32. The clamp jaws 42 and 44 may include on their forward ends arcuate, vertical extending delimbing blades 45, as well as circularly arranged, horizontally, and inwardly directed bark scoring teeth 47.

Figure 5:
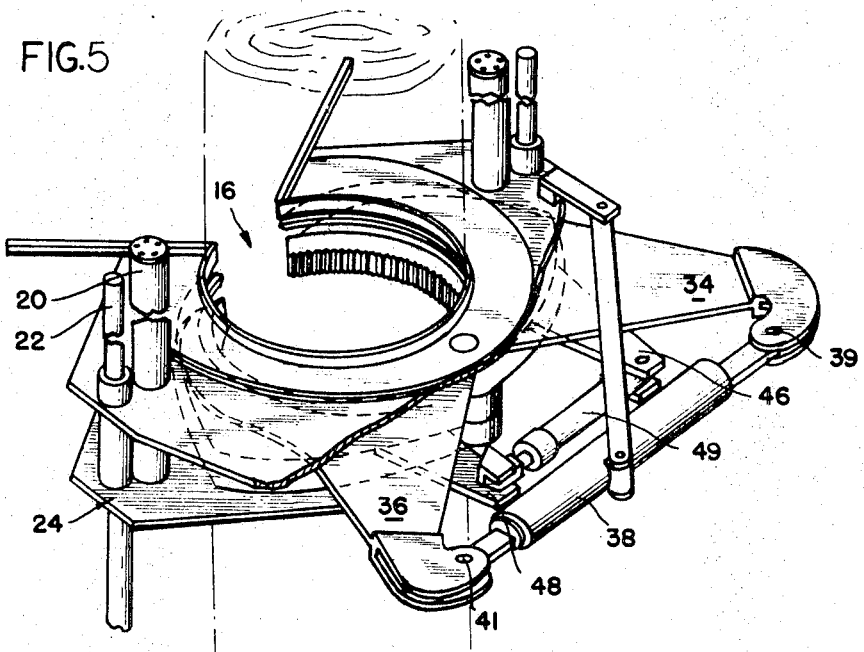
FIG. 5 is a fragmentary, perspective view from the rear of the shear and clamp assembly shown in FIG. 2, illustrated adjacent a tree in a position appropriate for a severing operation.

Referring to FIG. 5, the inner or rear ends 46, 48 of the jaws 42, 44, extend rearwardly beyond the pivot pin 32 and a double-acting hydraulic cylinder 49 is connected therebetween in a manner similar to the connection of the upper shear cylinder assembly 38.

The lower section 18 of the device (as shown in FIG. 2), comprises a lower shear 50 and clamp 52 similar in construction and operation to the upper shear 27 and upper clamp 40, except that the lower shear 50 is positioned below the lower clamp 52 to facilitate severing a tree as closely as possible to the ground level.

Figure 6:
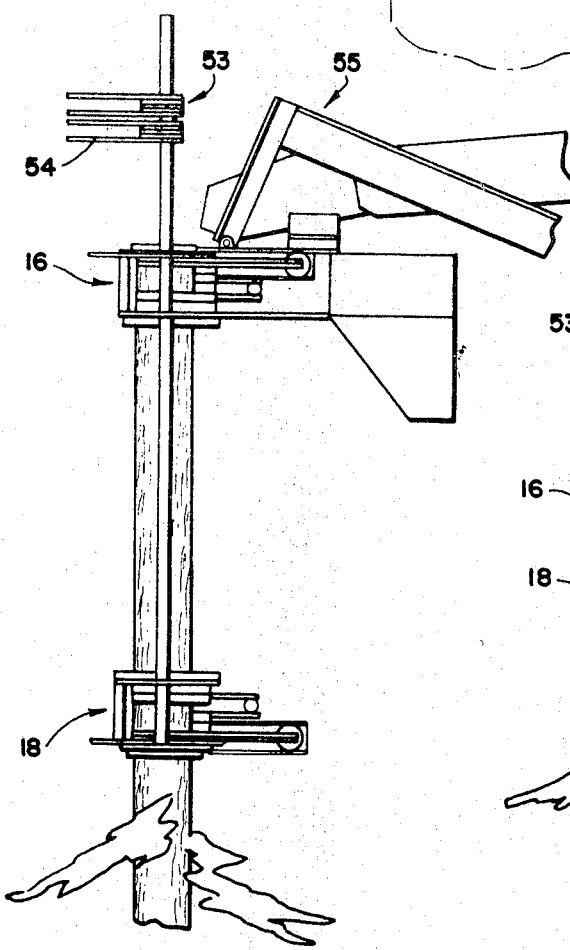
FIG. 6 is a schematic, elevational view of the shear and clamp assembly after a bolt has been cut and the lower section is extended to a lower position.
Figure 7:
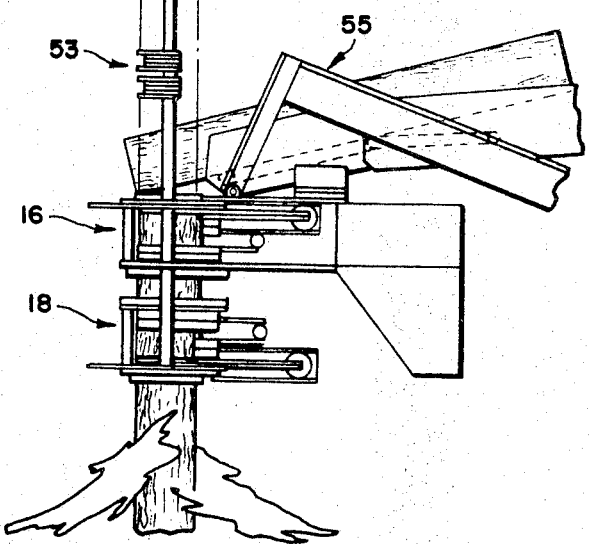
FIG. 7 is a schematic, elevational view similar to that shown in FIG. 6 but wherein the upper and lower sections are retracted to positions adjacent each other, as prior to a next cutting or severing operation of a sequence.

Referring to FIGS. 6 and 7, spring-loaded bolt kicker or fall director 53 is mounted on and above the frame 24, the kicker being operationally connected by a link to the blade 30 so that upon closing the blades a curved kicker arm 54 will pivot in a counterclockwise direction across the recess 26 thereby directing the fall of a severed bolt toward the chute 15.

Figure 4:
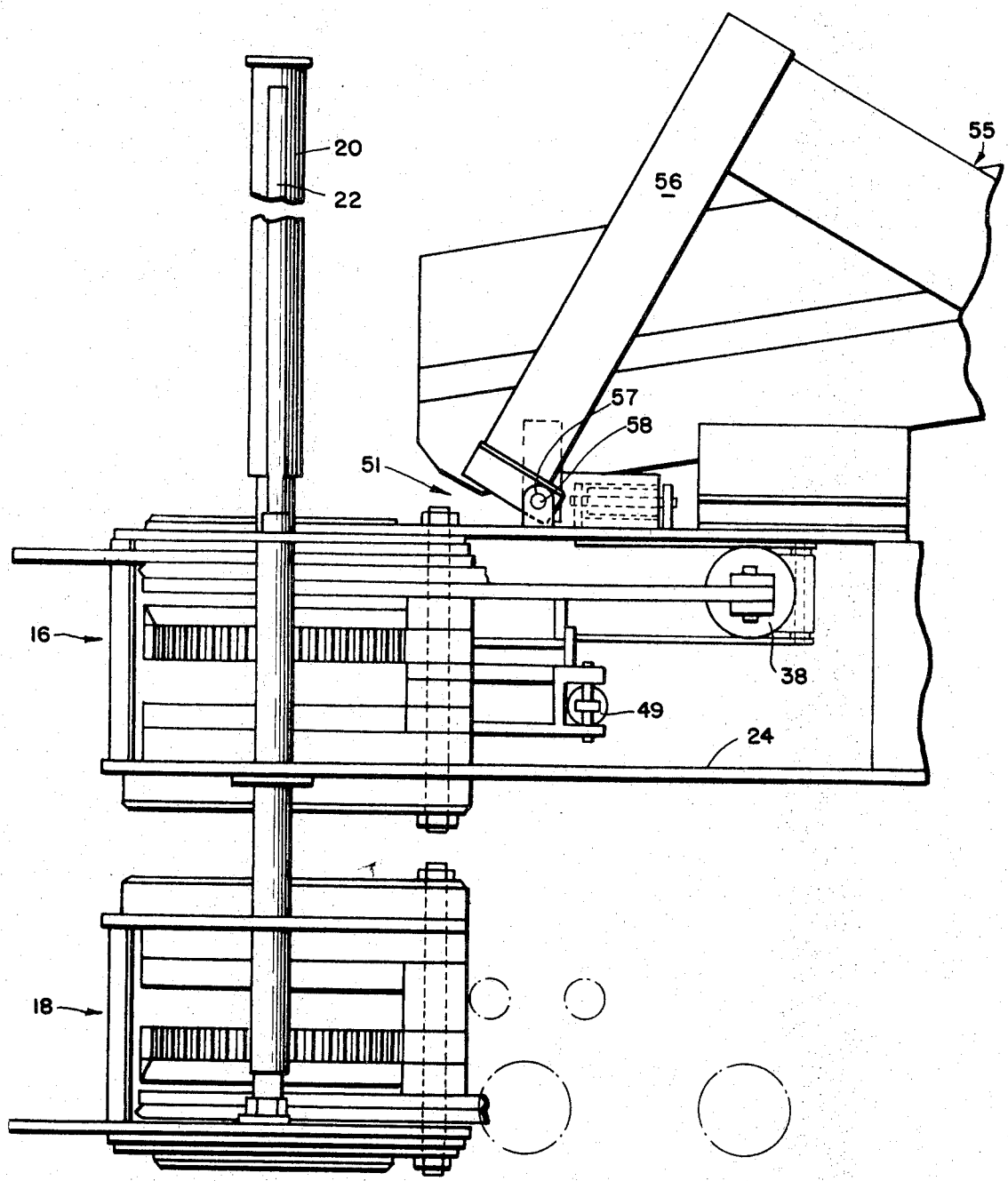
FIG. 4 is a side view of the tree shear and clamp assembly shown in FIG. 2.

As best seen in FIG. 4, to suspend the tree shear and clamp assembly 14 on the boom 12, a "pendulum-type" connection assembly 51 is provided. This assembly includes a generally L-shaped support beam 55, or sub-boom, rigidly connected to the upper end of the boom 12. The free end of the short leg 56 of the support beam 55 is downwardly directed and is provided with an aperture 57 for pivotal reception of horizontally and laterally directed pivot pins 58 connected to the frame 24. It is of importance that the connection assembly 51 be positioned so as to directly overlie the center of gravity of the shear and clamp assembly 14. In this manner, regardless of the vertical angular orientation of the boom 12, which, of course, varies as the apparatus is moved down a standing tree, the shear and clamp assembly 14 remains in a horizontal position convenient for embracing a standing tree.

Operation of the device as thus far described may be summarized as follows. Any suitable conventional hydraulic control system (now shown) may be manipulated by an operator positioned on the vehicle 10 to adjust the boom angle and length to position the shear and clamp assembly 14 adjacent the top of a tree, as shown in FIG. 1. The hydraulic control may be subsequently operated to place the hydraulic boom 12 in a "float" condition wherein the weight of the device is supported entirely on the tree. After another hydraulic control, to be discussed more fully hereinafter, is actuated to set the upper clamp 40. The vertical cylinders 20 may be then extended (FIG. 6) thereby delimbing and scoring that portion of the tree embraced by the lower section during its descent. The lower clamp 52 is then actuated, the upper shear 27 closed to sever a bolt, the upper shear 27 and clamp 40 opened, the vertical cylinders 20 retracted (FIG. 7) and the operation repeated until the entire standing tree has been sectionalized or bucked. Severed bolts are directed into the chute 15 by the kicker 53 and conveyed to a collection point. This operational sequence may be programmed or performed automatically as by electric or fluidic control means after initial placement of the device for the topping operation.

Referring to FIGS. 6 and 7, substantial forces axially of the tree may be imposed upon the upper section 16 during extension of the vertical cylinders 20 for the delimbing and scoring operation by the lower section 18. Of course, it is the function of the upper clamp 40 to fix the upper section 16 to the tree during this phase. However, it sometimes happens that the gripping action by the upper clamp 40 is insufficient and upward movement of the upper section 16 relative to the tree may occur resulting in improper delimbing and scoring and hindering overall operation in general.

To circumvent this problem, the present invention provides a control means 60 to aid in fixing the upper section 16 to the tree during delimbing by partially embedding the blades 28 and 30 in the tree during the delimbing phase.

Figure 3:
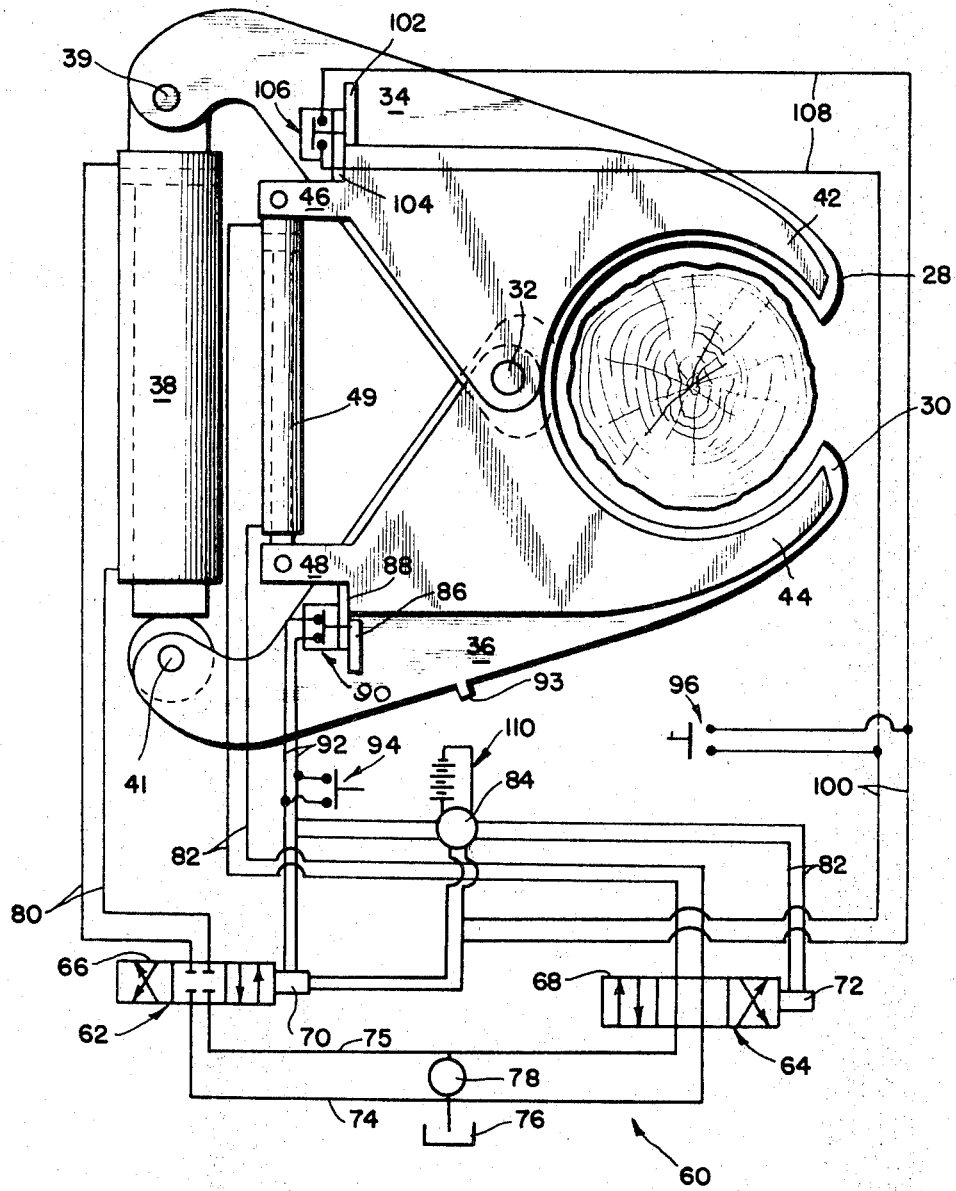
FIG. 3 is a fragmentary bottom view of the tree shear and clamp assembly shown in FIG. 2, including a schematic hydraulic and electrical diagram of a control means according to the present invention.

Referring to FIG. 3, the control means 60, which is schematically shown therein, includes an upper shear cylinder hydraulic control valve assembly 62 and an upper clamp hydraulic control valve assembly 64. The valve assemblies 62 and 64 include spool valves 66 and 68 respectively, which may be actuated by electric actuators such as modulating solenoids 70 and 72 or the like. The spool valve 66 includes open, close and hold positions and the spool valve 68 may be considered to include one open and one close position for purposes which will be discussed more fully hereinafter. The spool valves 66 and 68 are connected by suitable hydraulic conduits 74, 75 to a reservoir 76 and a source of fluid under pressure 78, such as a hydraulic accumulator. Other conduits 80 and 82 connect the spool valves 66 and 68 to the piston and rod ends of the shear cylinder 38 and the clamp cylinder 49, respectively.

Although the valve assemblies 62 and 64 may be selectively controlled by manual actuation by the operation of selector switches, not shown, it is preferred that these valve assemblies additionally be controlled by a sequence control stepping switch 84. In automatic operation of the overall device, after initial placement adjacent the top of a standing tree, the stepping switch responds to signals from a series of limit switches automatically actuated at the end of each functional phase of the step-by-step operation and acts to initiate the next phase whereby the operational sequence is continuously repeated as the device is moved down a standing tree which is to be harvested. An understanding of the specific details of the overall automatic control is not necessary to appreciate the present invention except insofar as they relate to the control means 60 for partially embedding the upper shear blades 28 and 30 during delimbing, which will now be discussed.

As best seen in FIGS. 3 and 4, the underside of the upper shear blade extension 36 is provided with a downwardly extending contact element 86 which cooperates with a rearwardly positioned upwardly extending contact element 88 on the upper side of the upper clamp extension 46. A first limit switch 90 of a conventional type, is operatively associated with the contact elements 86 and 88 so that engagement of the contact elements will close the switch 90. The first limit switch 90 is connected by electrical leads 92 to the stepping switch 84, and the electric actuator 70 of the shear valve assembly 62. Also connected in the leads 92 is a second limit switch 94 which is mechanically associated with the upper section 16 and the guide rods 22 so that complete extension of the vertical cylinders 20 to move the lower section 18 to its maximum distance away from upper section 16, functions to close the second limit switch 94. A third limit switch 96 is mechanically associated with the frame 24 and a projection 98 on the forward face of the upper shear blade extension 36 so that complete closing of the shear blades 28 and 30 functions to close the third limit switch 96. This switch is connected by leads 100 to the stepping switch 84 and the shear valve electric actuator 70.

Additionally, the under side of the upper shear blade extension 34 is provided with a downwardly extending contact element 102 which cooperates with a rearwardly positioned upwardly extending contact element 104. A fourth limit switch 106 is operatively associated with the contact elements 102 and 104 so that engagement of the contact elements will close the switch 106. This switch is connected by leads 108 to the leads 100 for the third limit switch 96. The stepping switch 84 is further connected to a source of current, such as a battery 110, and to the clamp valve electric actuator 72.

Operation of the control means 60 is as follows. After the device is positioned adjacent the top of a tree to be harvested, the stepping switch 84 is activated. Fluid is constantly directed from the accumulator 78 to the head end of the clamp cylinder 49 thereby tending to extend this cylinder. In this condition, this cylinder may be considered to function as a hydraulic spring. However, because of the abutment between the contacts 86 and 88, this clamp cylinder 49 can only extend upon extension of the shear cylinder 28 which is of a substantially larger diameter. However, upon abutment of the contacts 86 and 88, limit switch 90 is closed thereby moving the shear cylinder valve 62 from a hold to a "close" position wherein fluid is directed to the piston end of the shear cylinder 38 to extend the same and close the shear blades 28 and 30. As the blades 28 and 30 close, the clamp cylinder 49 is permitted to extend thereby maintaining abutment of the contacts 86 and 88 as the clamp jaws 42 and 44 follow the blades 28 and 30 in a closing action. However, upon engagement of the clamp jaws 42 and 44 with the tree, further closing action of the clamp jaws is prohibited while the blades 28 and 30 continue closing thereby interrupting the abutment between contacts 86 and 88 and opening the limit switch 90. At this point, the valve 62 is returned to a hold position and the closing action of the shear blades is interrupted as the blades become partially embedded in the tree.

The stepping switch 84 then functions to actuate a hydraulic valve, not shown, to extend the vertical cylinders 20 between the upper and lower sections 16 and 18. Upon complete extension of the vertical cylinders 20, the second limit switch 94 is actuated and the shear valve 62 again moves to a "close" position wherein extension of the shear cylinder 38 is completed and a tree top or bolt completely severed. Upon movement of the shear blades 28 and 30 to a completely closed position, the projection 98 actuates the third limit switch 96 to move the shear valve 62 to an "open" position. The shear cylinder 38 is retracted until the contact 102 abuts the contact 104 thereby opening the fourth limit switch 106 which causes the shear valve 62 to return to a "hold" position. At this point, the lower clamp 52 is actuated to grip the tree, the vertical cylinders 20 are retracted and the series of steps automatically repeated.

In this manner the upper shear blades 28 and 30 are partially embedded in the tree prior to the delimbing and scoring step and greatly aid the upper clamp 40 in fixing the device. In this light, the upper clamp 40, in addition to functioning as a tree gripper, may also be considered to be a tree contacting gage which tailors the extent to which the blades close during partial embedding in accordance with the outside diameter of the specific tree being harvested.

While in the foregoing detailed description reference has been made to but one specific embodiment of the present invention, it should be understood that the structure and operation thereof may be varied by those skilled in the art without departing from the spirit and scope of the present invention which is to be defined by the following claims.

We claim:

1. A method of harvesting trees with a device having first and second sections moveable toward and away from each other, said first section including severing means, said method comprising:

a. partially embedding said severing means in a tree to aid in fixing the device thereto;
b. moving said second section relative to said first section; and
c. severing a portion of the tree at the location of initial partial embedding.

2. The method according to claim 1 wherein said second section includes delimbing means, said method further including delimbing a portion of the tree during movement of said second section relative to said first section.

3. The method according to claim 2 wherein each of said sections includes tree clamping means, said method further including clamping said first section to the tree during movement of said second section, and clamping said second section to the tree subsequent to said complete severing of a portion of the tree.

4. In a tree harvesting device comprising:
tree severing means having at least one moveable blade;
power means for moving said blade; the improvement comprising:
control means for partially embedding said blade a predetermined distance in said tree to fix the same thereto.

5. A tree harvesting device according to claim 4, said device further including tree diameter gage means associated with said control means for limiting the depth to which the blade is partially embedded in the tree according to the diameter of the tree.

6. A tree harvesting device according to claim 5, said tree diameter gage means being defined by first clamp means for clamping the device to a standing tree.

7. A tree harvesting device according to claim 6, said device further including second clamp means moveable toward and away from said first clamp means, and delimbing means connected to said second clamp means.

8. A tree harvesting device according to claim 6, further including telescopic boom means for supporting the remainder of the device on a vehicle but adapted to be placed in a float condition wherein said device is supported entirely on the tree to be harvested.

9. A tree harvesting device according to claim 8 wherein said severing means includes a pair of tree shearing blades.

10. A tree harvesting device according to claim 9, further including first stop means on said first clamp means, second stop means on one of said blades, and limit switch means associated with said stop means for controlling said power means.